United States Patent
Cui et al.

(10) Patent No.: US 11,150,952 B2
(45) Date of Patent: *Oct. 19, 2021

(54) ACCELERATING AND MAINTAINING LARGE-SCALE CLOUD DEPLOYMENT

(71) Applicant: International Business Machines Corporation, Armonk, NY (US)

(72) Inventors: Xue Xiang Cui, Beijing (CN); Bin Gu, Beijing (CN); Jian Qiu Wang, Beijing (CN); Gong Zhang, Beijing (CN); WuMi Zhong, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 86 days.

This patent is subject to a terminal disclaimer.

(21) Appl. No.: 16/511,149

(22) Filed: Jul. 15, 2019

(65) Prior Publication Data
US 2019/0370075 A1    Dec. 5, 2019

Related U.S. Application Data

(63) Continuation of application No. 15/866,647, filed on Jan. 10, 2018, now Pat. No. 10,592,290.

(51) Int. Cl.
*G06F 9/455*    (2018.01)
*G06F 9/50*    (2006.01)
(Continued)

(52) U.S. Cl.
CPC .......... *G06F 9/5027* (2013.01); *G06F 9/5061* (2013.01); *G06F 16/907* (2019.01);
(Continued)

(58) Field of Classification Search
None
See application file for complete search history.

(56) References Cited

U.S. PATENT DOCUMENTS 10,592,290 B2 * 3/2020 Cui .................. H04L 67/32
2012/0096165 A1 * 4/2012 Madduri ........... H04L 41/5009
    709/226

(Continued)

OTHER PUBLICATIONS

Sakr et al., "A Survey of Large Scale Data Management Approaches in Cloud Environments", 2011, IEEE, pp. 311-336. (Year: 2011).*

(Continued)

*Primary Examiner* — Kenneth Tang
(74) *Attorney, Agent, or Firm* — Garg Law Firm, PLLC; Rakesh Garg; Michael A. Petrocelli (57) ABSTRACT

A deployment specification for implementing a requested cloud service is received by a server. A resource pool is queried by the server for available resources required by the deployment specifications. The resource pool includes a plurality of pre-configured resources for implementing one or more cloud services. A first resource required by the deployment specification is determined to be available within the resource pool. First resource metadata associated with the first resource is requested from a database. The resource metadata includes a resource identifier and a resource type of the first resource. The resource metadata associated with the first resource is received from the database. The first resource is deployed from the resource pool according to the deployment specification to implement the requested cloud service.

10 Claims, 10 Drawing Sheets

(51) Int. Cl.
*H04L 29/08* (2006.01)
*G06F 16/907* (2019.01)
*H04L 12/24* (2006.01)

(52) U.S. Cl.
CPC ...... *H04L 41/5051* (2013.01); *H04L 67/1002* (2013.01); *H04L 67/32* (2013.01); *H04L 41/5096* (2013.01); *H04L 67/10* (2013.01)

(56) References Cited

U.S. PATENT DOCUMENTS

| | | | |
|---|---|---|---|
| 2013/0232498 A1* | 9/2013 | Mangtani | G06F 9/5038 718/104 |
| 2013/0238785 A1* | 9/2013 | Hawk | G06F 9/5077 709/224 |
| 2014/0068599 A1* | 3/2014 | Kannan | G06F 8/61 718/1 |
| 2015/0128132 A1* | 5/2015 | Pohlmann | G06F 9/45533 718/1 |
| 2015/0378765 A1* | 12/2015 | Singh | G06F 9/50 718/1 |
| 2018/0129939 A1* | 5/2018 | Yang | G06N 3/04 |
| 2018/0352002 A1* | 12/2018 | Ramachandran | H04L 63/102 |

OTHER PUBLICATIONS

Sakr et al., "A Survey of Large Scale Data Management Approaches in Cloud Environments", 2011, IEEE Communications Surveys & Tutorials, vol. 13, No. 3, Third Quarter, pp. 311-321. (Year: 2011).*
List of all IBM related dockets. Appendix P. 2019.

* cited by examiner

ACCELERATING AND MAINTAINING LARGE-SCALE CLOUD DEPLOYMENT

TECHNICAL FIELD

The present invention relates generally to a method for cloud deployment. More particularly, the present invention relates to a method to accelerate and maintain a large-scale cloud deployment.

BACKGROUND

Cloud computing enables access to shared configurable system resources that can be provisioned over a network, such as the Internet, to provide computing services to users. The computing resources may include physical or virtual components within a computer system that are used to provide a computing service such as central processing units (CPUs), random access memory and virtual memory, storage devices, subsystems, clusters, virtual machines, and network throughput. Some forms of cloud computing include infrastructure as a service (IaaS), software as a service (SaaS), and platform as a service (PaaS). In IaaS, a cloud provider hosts infrastructure components traditionally present in an on-premises data processing center such as servers, storage and networking hardware, to provide computing services. In PaaS, a cloud provider offers, in addition to the underlying infrastructure components, operating systems and middleware to provide computing services. In SaaS, a cloud provider offers the cloud computing infrastructure as well as applications for users. In order for a cloud provider to offer computing services to a user, resources of the cloud provider must be configured and deployed according to the cloud computing specifications of the user.

SUMMARY

The illustrative embodiments provide a method. An embodiment of a method includes receiving, by a server, a deployment specification for implementing a requested cloud service. The embodiment further includes querying, by the server, a resource pool for available resources required by the deployment specifications, the resource pool including a plurality of pre-configured resources for implementing one or more cloud services. The embodiment further includes determining that a first resource required by the deployment specification is available within the resource pool. The embodiment further includes requesting first resource metadata associated with the first resource from a database, the resource metadata including a resource identifier and a resource type of the first resource. The embodiment still further includes receiving the resource metadata associated with the first resource from the database, and deploying the first resource from the resource pool according to the deployment specification to implement the requested cloud service.

An embodiment further includes determining that the first resource required by the deployment specification is not available within the resource pool, and creating a second resource second resource required by the deployment specification within the resource pool. An embodiment still further includes adding second resource metadata associated with the second resource to the database. An embodiment still further includes deploying the second resource from the resource pool according to the deployment specification to implement the requested cloud service.

An embodiment further includes creating a plurality of resources within the resource pool, pre-assembling and pre-configuring the plurality of resources, and registering metadata corresponding to the plurality of resources in the database.

An embodiment further includes receiving performance data associated with utilization of the pre-configured resources within the resource pool over a predetermined time period, and adjusting a size of the resource pool based upon the performance data. In an embodiment, the performance data includes real-time data.

In an embodiment, the database includes a resource registry. In another embodiment, the server includes a command line interface (CLI). In another embodiment, the deployment specifications are received from a deployment director component.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Various illustrative embodiment provide for a method, system, and computer program product to accelerate and maintain large-scale cloud deployment. Deployment and maintenance of a large-scale cloud environment can be a time-consuming, difficult, and resource-wasting process for businesses as well as individuals. Traditionally, a new deployment will first provision dozens of virtual machines (VMs) from an infrastructure as well as install operating system (OS) components and applications to all of the individual nodes. Some installations and configurations which have dependencies need to be performed synchronously. Synchronous installation and configuration may result in a slow down of the deployment process and increase the risk of failure of the deployment. If an OS or an application needs to be updated, separate operations are often required to upgrade the specific nodes in the whole cloud environment.

Various errors may occur during deployment and upgrade of a cloud environment and these errors are often difficult to debug and reinstall. In addition, such errors may lead to unpredictable situations, and even bring down the whole cloud platform resulting in a significant impact to a production environment. Also, environmental upgrades of a cloud deployment often cause long-term service outages. Such factors all make deploying and maintaining a large-scale cloud deployment a pain point both for business, and individuals.

The illustrative embodiments recognize that the presently available tools or solutions do not address these needs or provide adequate solutions for these needs. The illustrative embodiments used to describe the invention generally address and solve the above-described problems and other problems related to large-scale cloud deployment.

Various embodiments provide a system and method to improve efficiency, eliminate errors, and provide a cognitive thought process during deploying and maintaining of a large-scale cloud deployment. In an embodiment, cloud resources are deploying from a resource pool having preassembled and preconfigured components subsystems, clusters and single nodes based on cloud requirements. In one or more embodiment, resources in the resource pool perform self-upgrading when a particular resource is idle. In one or more embodiments, when the cloud environment needs to be migrated, the cloud deployment switches to the latest resource. In one or more embodiments, resource pool management uses a cognitive process to dynamically allocate resources within the resource pool by computing a reverse calculation based on real-time data of the cloud. In particular embodiments, sizes of the resource pool, a subsystem, and a cluster in the resource pool, are adjusted dynamically.

Typically, during deployment of a large-scale cloud, a cloud platform may contain more than one hundred VMs and may take several hours or more to complete. Usually, a large deployment manifest file is used to specify detail information about releases, applications, VM specifications, and other configuration aspects of the cloud. If the cloud deployment is interrupted, it is difficult to debug the root cause of the interruption and redeploy the cloud environment after the root cause is debugged.

In accordance with one or more embodiments, the most frustrating part of cloud deployment, installation and configuration, is separated from the deployment process. Instead of deploying with fresh VMs, various embodiments fetch preassembled and pre-configured subsystems, clusters and nodes and complete any remaining configurations. At the same time, in one or more embodiments the deployment manifest file is simplified such that it only specifies which subsystem or cluster is to be included and omits the specific deployment details regarding each subsystem or cluster. In one or more embodiments, each subsystem and cluster in the resource pool has an associated manifest file for detailed specifications of the particular subsystem or cluster. In this way, errors may be exposed and diagnosed before the formal deployment. Accordingly, when the deployment begins, the deployment will be far more efficient and smooth.

In one or more embodiments, a pool resource server application recognizes subsystems and clusters within a cloud deployment. For example, a particular cloud application platform may include a scheduler to implement application scheduling and management responsibility in which the scheduler includes a cloud controller, and a cloud controller database (CCDB) in a high-availability (HA) cluster in the cloud platform. In the example, one node of the cloud cluster may be a master and two or more nodes may be a slave. In accordance with one or more embodiments, the components in the scheduler and CCDB cluster are pre-installed and pre-configured in a resource pool based and a manifest is associated with each components. In one or more embodiments, the pool resource server application prepares other single nodes for deployment. In an embodiment, when deployment begins, the pool resource server application finds a desired resource available in the resource pool and completes any remaining configurations within the resource. In an embodiment, pool resource server application marks the resource as being in use.

In an embodiment, when OS components or applications need to be updated, the resource pool receives a notification form a release management server, and available resources are upgraded to a specified version. When the deployment needs migration, pool resource server application finds a new corresponding resource, switches the deployment to the new resource, and releases the old resource. In the embodiment, the old resource is released back to the resource pool for reuse.

In an embodiment, at an initial state, a pool size of the resource pool is set based on a current scale of the cloud and the largest number of resources that need to be updated synchronously. In consideration of cost and resource utilization, after the cloud is successfully deployed, the resource pool server application adjusts the pool size cognitively based on rules set by reverse calculation on real-time data of performance metrics of the cloud such as a number of application requests, an amount of memory required, a number of CPUs required, on each application and calculates background cells which manage and maintain task and long-running processes (LRPs) within the cloud. In the embodiment, the resource pool server application determines whether to increase or reduce the number of cells. According to the trends of changes in resources needed within the cloud, the resources within the resource pool may be maintained at a reasonable size.

In one or more embodiments, a resource pool server component functions as controller of the resource pool, provides an application programming interface (API) to a deployment a director, and interacts with an Infrastructure as a Service (IaaS) API. IaaS is a form of cloud computing that provides virtualized computing services over a network. In IaaS a cloud provider hosts infrastructure components used to implement a particular cloud service deployment. In an embodiment, the resource pool server component contains interfaces such as a "create_resource" interface, an "update_resource" interface, and a "get_resources_by_deployments" interface.

In one or more embodiments, a pool server command line interface (CLI) functions as an interface to interact with the resource pool server component. In one or more embodiments, the pool server CLI creates, verifies, and manages resources such as subsystems, clusters, and VMs based on cloud deployment requirements.

In one or more embodiments, a resource finder component determines whether a resource in the resource pool matches requirements of a particular deployment request. In a particular embodiment, the resource finder includes customized resource matching rules to determine whether a resource in the resource pool matches the requirements. In an example, a resource matching rule finds a resource according to a specific resource requirement such as memory usage, CPU utilization, and a number of applications a subsystem can support. In one or more embodiments, a resource registry stores metadata for resources within the resource pool and provides getter/setter functionalities that manage the resource's metadata.

In one or more embodiments, a create_resource interface provides resource creating functions during deployment. When a new deployment is kicked-off, the director calls the resource pool server to obtain the resource metadata from the resource registry matching a deployment specification. Instead of creating and configuring an environment from a base OS, the resource pool server fetches a pre-assembled and pre-configured resource from the resource pool that matches the deployment specification. If a matching resource is not found, the create_resource interface creates a resource in the IaaS and registers the metadata of the new resource in the resource registry.

In one or more embodiments, an update_resource interface provides for resource upgrade functions within the cloud deployment. In accordance with one or more embodiments, before upgrade of a deployed cloud service idle resources in the resource pool perform a self-upgrading procedure and update resource metadata in the resource repository to reflect the upgraded resource. When an upgrade of the deployed cloud service begins, the resource pool server retrieves the updated resource metadata from the resource registry. Instead of upgrading each individual node and causing potentially hours of service outage, the resource pool server switches to the resource with the latest version that has been verified as previously updated.

Accordingly, one or more advantages that may be provided by one or more embodiments described herein includes improving the user experience of individuals and businesses, improving the efficiency of large-scale cloud deployment, and simplifying and decoupling the deployment process, releasing human resources, and balancing cost of deployment in a cognitive manner. An embodiment may provide an advantage of highly improved deployment stability and efficiency as resources are pre-assembled and pre-configured. Another embodiment may provide an advantage of reducing service outages and lowering risk during upgrade of a cloud service due to the switching to existing and verified resources in a matter of minutes. Another embodiment may provide one or more advantages of exposing issues of deployment and upgrade, if any, as early as possible, and simplified debugging of deployment issues due to problems within the deployment being decoupled to smaller problems.

An embodiment can be implemented as a software application. The application implementing an embodiment can be configured as a modification of an existing cloud platform system, as a separate application that operates in conjunction with an existing cloud platform system, a standalone application, or some combination thereof.

The illustrative embodiments are described with respect to certain types of resources, services, transmissions, resource deployment procedures and algorithms, GUIs, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
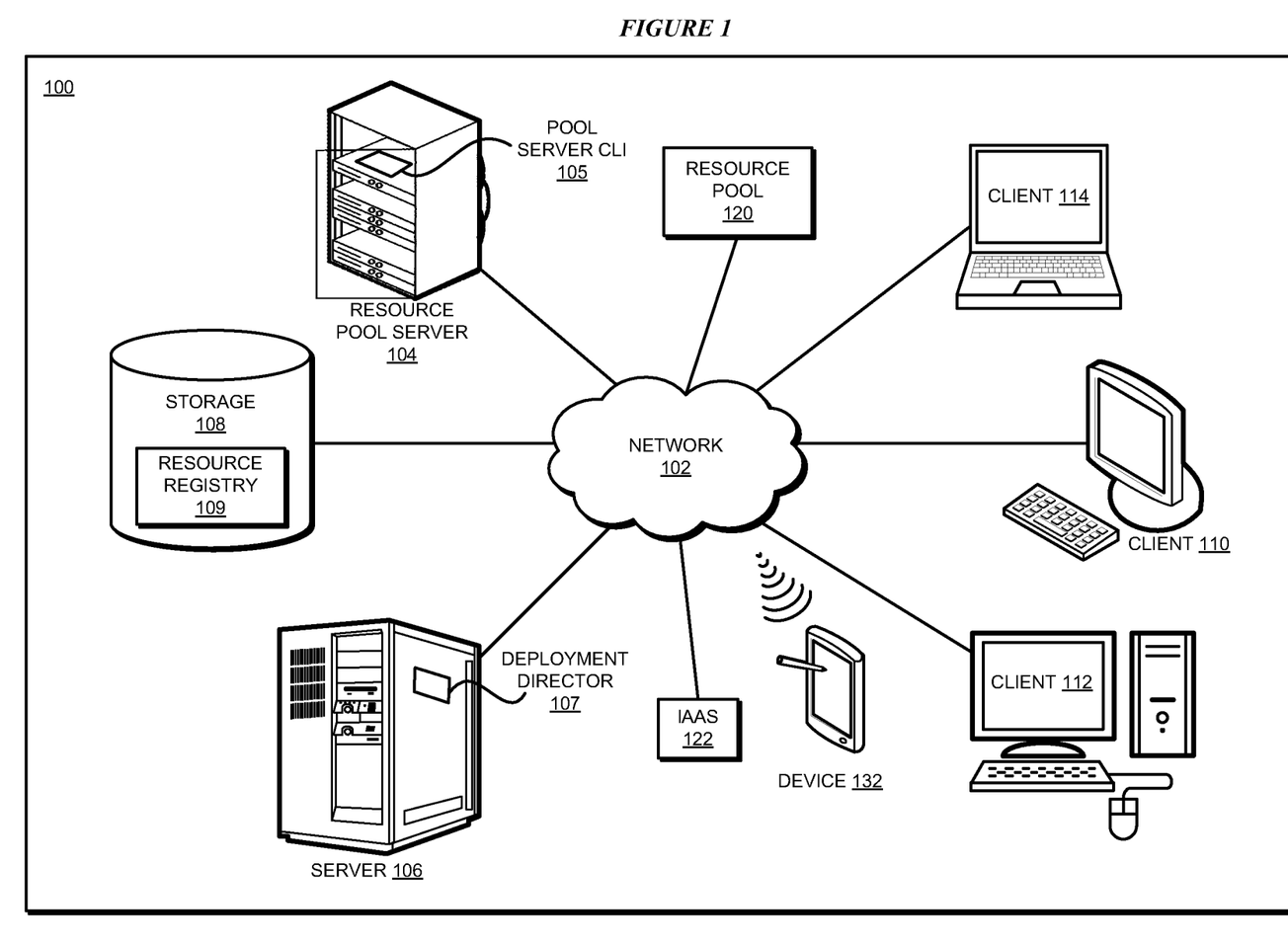
FIG. 1 depicts a block diagram of a network of data processing systems in which illustrative embodiments may be implemented.
Figure 2:
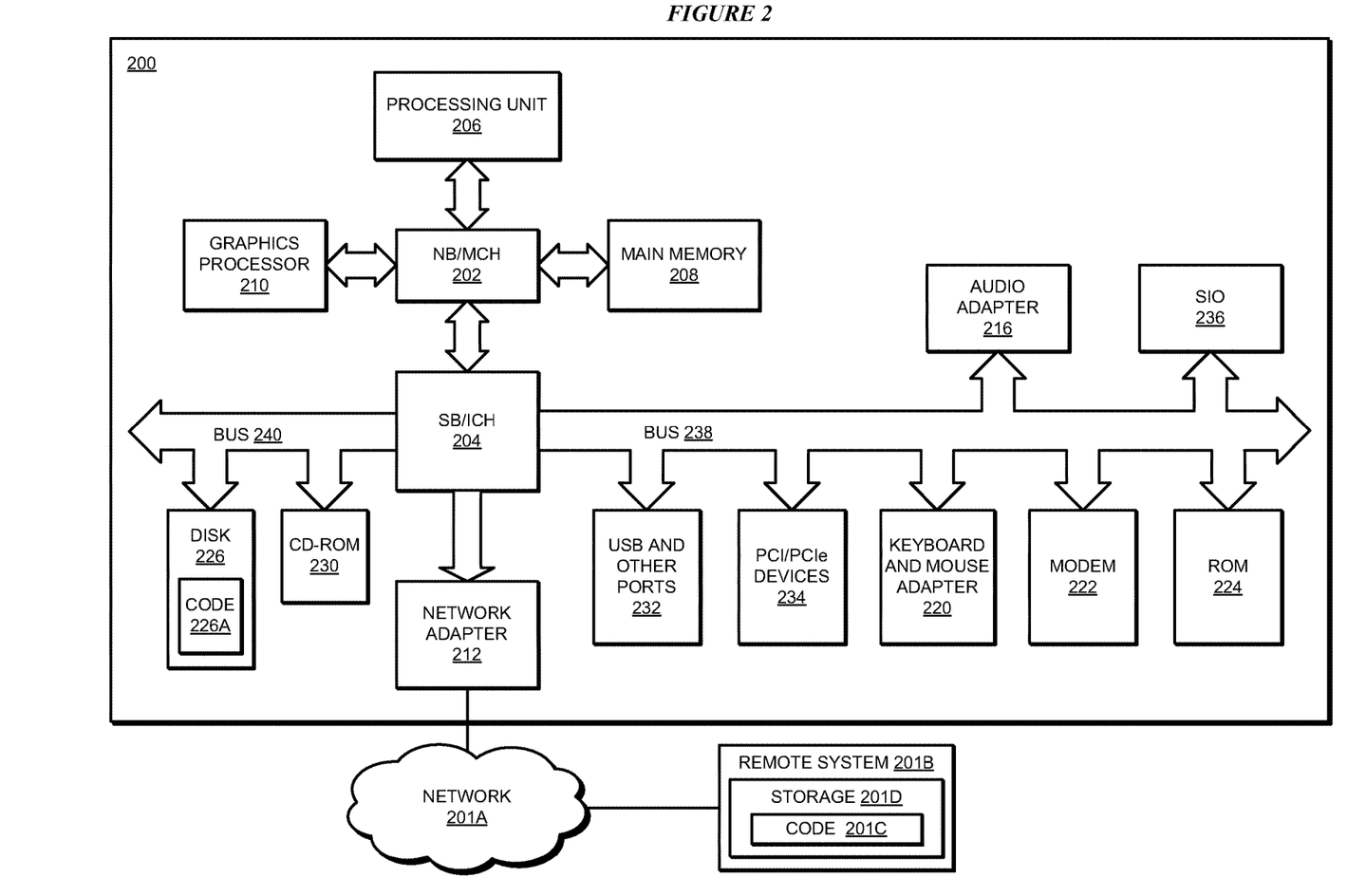
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Resource pool server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Pool server CLI 105 of resource pool server 104 implements an embodiment described herein. Server 106 includes a deployment director application 107 configured to receive a request for cloud deployment from a user and send the cloud deployment request to pool server CLI 105. In other embodiments, application 105 may be configured to receive deployment requests directly. Resource registry 109, including metadata associated with resources in a resource pool 120, may be stored in storage unit 108 as shown or supplied by another source (not shown). Resource pool 120 includes one or more pre-assembled and/or pre-configured resources for implementing a cloud service deployment as further described herein. In particular embodiments, the resources include one or more subsystems, clusters, or components for implementing a cloud service.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
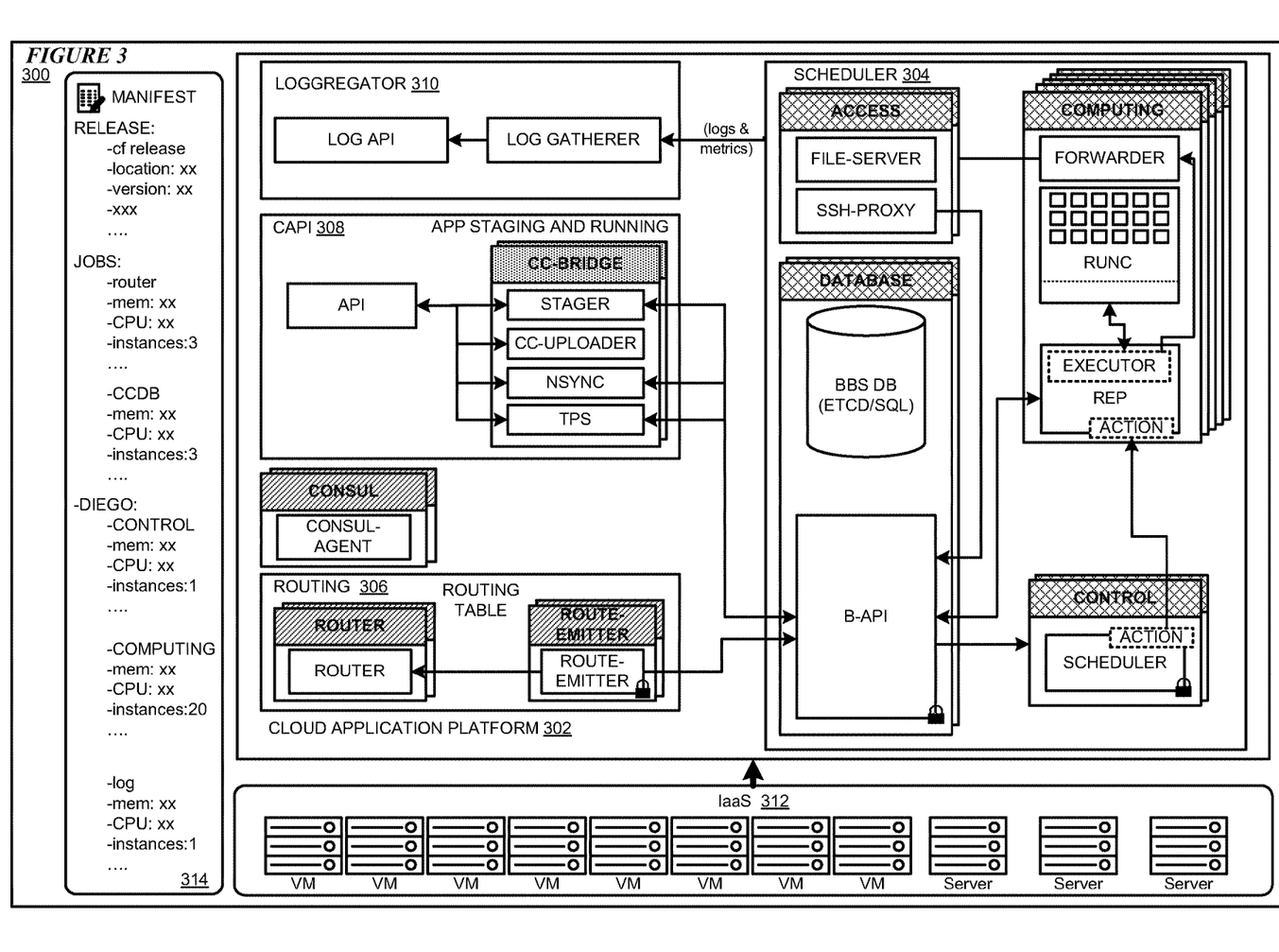
FIG. 3 depicts a block diagram of an example configuration for traditional large scale-cloud deployment.

With reference to FIG. 3, this figure depicts a block diagram of an example configuration 300 for traditional large scale-cloud deployment. Configuration 300 includes a cloud application platform 302 and a scheduler 304. Cloud application platform 302 includes a routing component 306, a cloud controller API (CAPI) component 308, and a loggregator component 310. Routing component 306 includes a routing table, a router component, and a router-emitter component configured to route traffic to different components within the cloud. CAPI component 308 includes an API and cloud controller bridge configured to perform application staging and running functions. Loggregator component 310 includes a log API and log gatherer component configured to collect logs from applications and metrics data from component within the cloud platform.

Scheduler 304 includes a database component, access component, a number of computing components, and a control component. Scheduler 304 is configured to schedule and runs tasks and long-running processes (LRPs) within the cloud platform. A computing component includes a rep component configured to manage container allocations against resource constraints in the computing component, a RUNC component configured to provide a platform-independent server and client to manage containers, and a forwarder configured to forward application logs to loggerator 310. The control component includes a scheduler component to schedule tasks and LRP instances and distribute work using a scheduling algorithm. The database component maintains a real-time representation of the state of scheduler 304 including all desired LRPs, running LRP instances, and tasks.

Cloud application platform 302 is in further communication with an IaaS 312 including a number of VMs and servers. A large manifest file 314 is used to specify detail information about releases, applications, VM specifications, and other configuration aspects of the cloud. In the example of FIG. 3, manifest file 314 includes release details, job details, and other information about the components of the cloud platform. In the example of FIG. 3, if the cloud deployment is interrupted, it is difficult to debug the root cause of the interruption and redeploy the cloud environment after the root cause is debugged.

Figure 4:
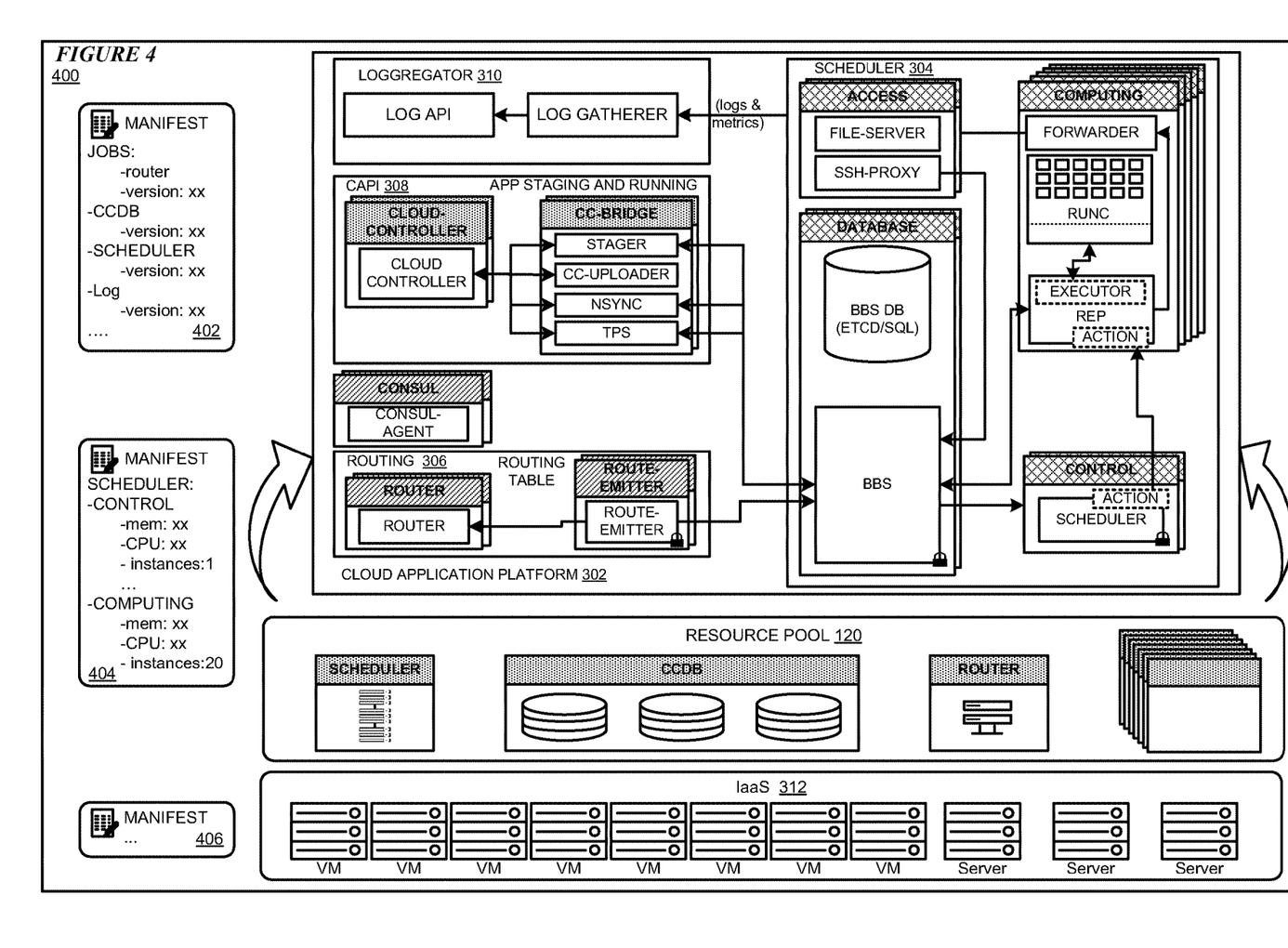
FIG. 4 depicts a block diagram of an example configuration for accelerating and maintaining a large-scale cloud deployment in accordance with an illustrative embodiment.

With reference to FIG. 4, this figure depicts a block diagram of an example configuration 400 for accelerating and maintaining a large-scale cloud deployment in accordance with an illustrative embodiment. Configuration 400 includes cloud application platform 302, scheduler 304, and IaaS 312 described with respect to FIG. 3. Configuration 400 further includes resource pool 120 as described herein with respect to various embodiments. In at least one embodiment, resource pool 120 includes pre-assembled and/or pre-configured resources such as subsystems, cluster or components, of the cloud platform. In the particular embodiment illustrated in FIG. 4, resource pool 120 includes a scheduler, a CCDB cluster, a router, and other components. Configuration 400 includes a number of manifest files including a first manifest file including detailed specifications of components of cloud application platform 302 and a second manifest file including detailed specifications of components of scheduler 304. In an embodiment, each resource within resource pool 120 has an associated manifest file 406 for detailed specifications of the particular resource.

In accordance with one or more embodiments, the components in the scheduler and CCDB cluster are pre-installed and pre-configured in a resource pool based and a manifest is associated with each components. In one or more embodiments, the pool resource server application prepares other single nodes for deployment. In an embodiment, when deployment begins, the pool resource server application finds a desired resource available in the resource pool and completes any remaining configurations within the resource. In an embodiment, pool resource server application marks the resource as being in use.

Figure 5:
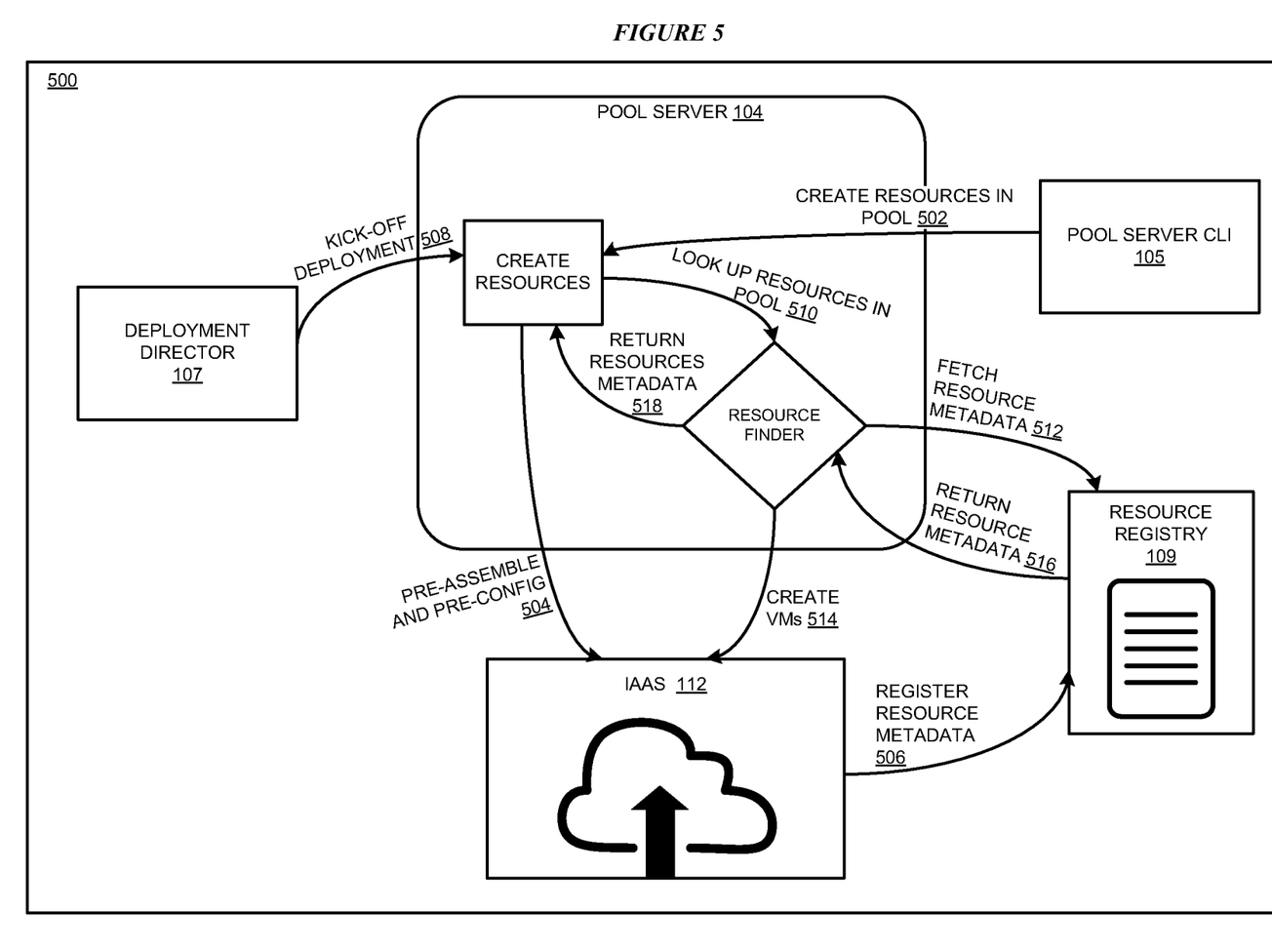
FIG. 5 depicts a block diagram of a process flow for creating and validating resources within a resource pool by a pool server.

With reference to FIG. 5, this figure depicts a block diagram of a process flow 500 for creating and validating resources within resource pool 120 by pool server 104. In 502, pool server CLI 105 initiates a create_resource process for creation of resources within resource pool 120 by pool server 104. In 504, the create_resource process of pool server 120 pre-assembles and pre-configures resources within IaaS 112. In 506, IaaS 112 registers resource metadata associated with the resources in resource registry 109. In 508, deployment director 107 sends a request to the create_resource process of pool server 104 to kick off deployment of a cloud service. In at least one embodiment, deployment director 107 sends deployment specifications to pool server 104 including the specifications of the requested cloud service. In 510, pool server 104 uses a resource finder to look up resources in resource pool 120 to satisfy the deployment specifications and determines whether one or more resources are available within resource pool 120 that satisfy the deployment specifications.

If a particular resource is available, in 512, pool server 104 fetches resource metadata associated with the resource from resource registry 109. In 516, resource registry 109 returns the resource metadata to pool server 104. If the particular resource is not available within resource pool 120, in 514, pool server 104 creates a virtual machine (VM) in IaaS 112 configured to implement the requirements of the resource. In 518, the resource finder returns the resource metadata to the create_resource process of pool server 104. Process flow 500 then ends.

Figure 6:
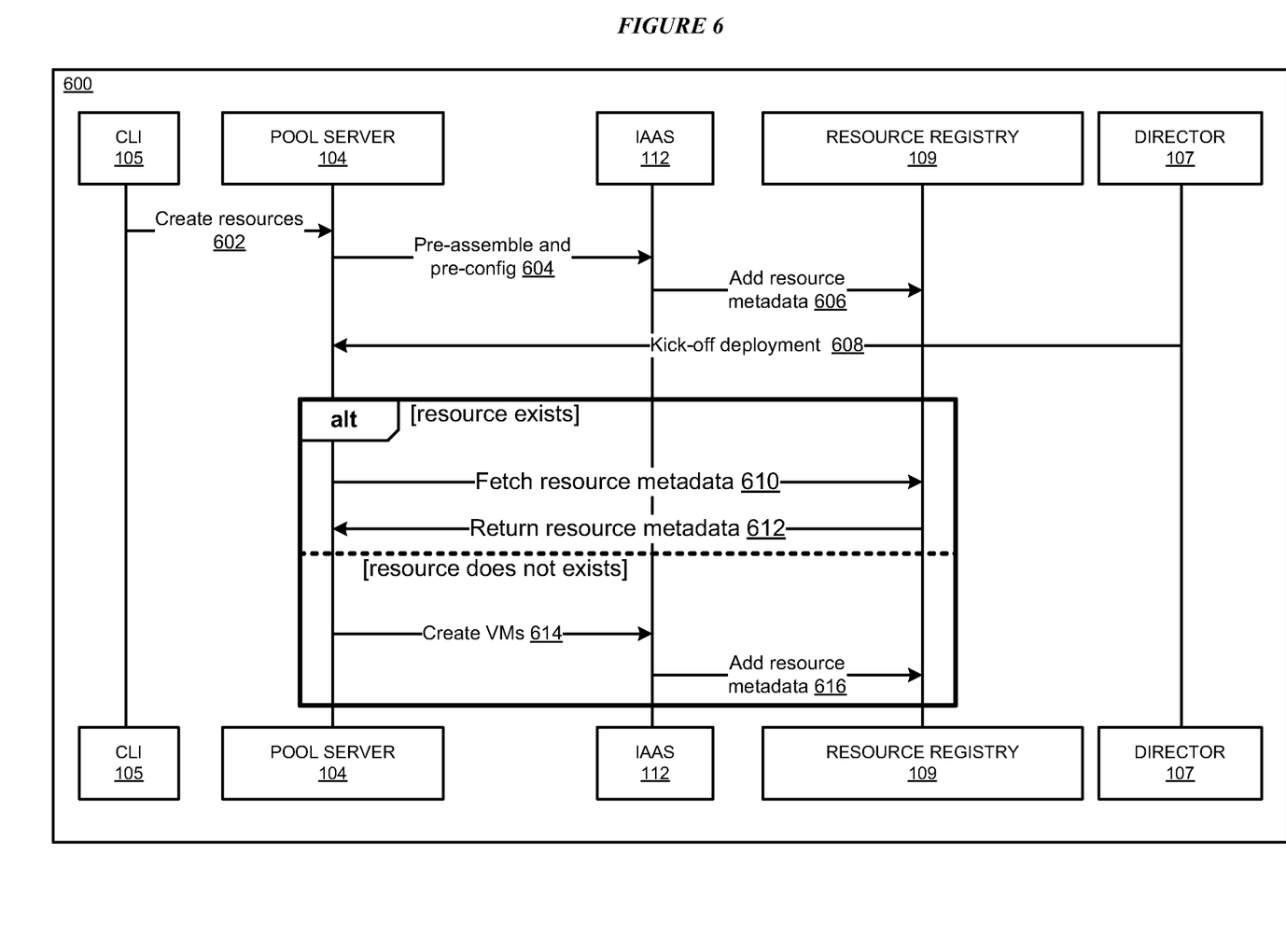
FIG. 6 depicts a block diagram of a signaling flow for creating and validating resources within the resource pool by the pool server.

With reference to FIG. 6, this figure depicts a block diagram of a signaling flow 600 for creating and validating resources within resource pool 120 by pool server 104. In 602, pool server CLI 105 sends a request to initiate creation of resources within resource pool 120. In 604, pool server 120 pre-assembles and pre-configures resources within IaaS 112. In 606, IaaS 112 adds resource metadata associated with the resources in resource registry 109. In 608, deployment director 107 sends a request to pool server 104 to kick off deployment of a cloud service satisfying deployment specifications including the specifications of the requested cloud service. In 610, pool server 104 determines whether one or more resources within resource registry 109 satisfying the deployment specifications and fetches resource metadata associated with the resource from resource registry 109. In 612, resource registry 109 returns the resource metadata to pool server 104.

Alternately, if the particular resource does not exist within resource pool 120, in 614, pool server 104 creates one or more VMs in IaaS 112 configured to implement the requirements of the resource. In 616, IaaS 112 adds the resource metadata associated with the new resource to resource registry 109. Signaling flow 500 then ends.

Figure 7:
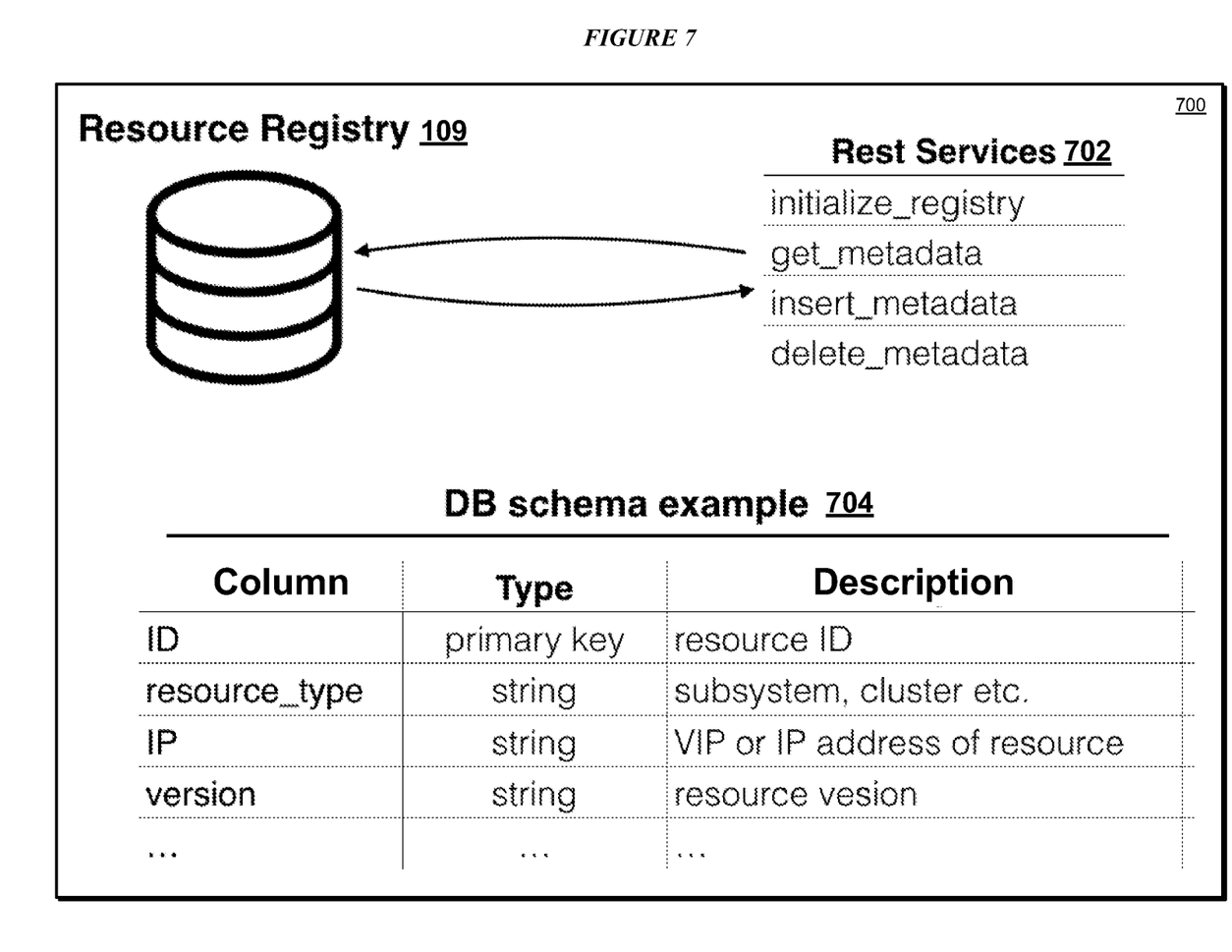
FIG. 7 depicts an example resource registry database schema in accordance with an illustrative embodiment.

With reference to FIG. 7, this figure depicts an example resource registry database (DB) schema 700 in accordance with an illustrative embodiment. Resource registry 109 has a number of associated representational state transfer (REST) services 702 to facilitate maintenance of resource registry 109 by pool server 104.

In the particular example of FIG. 7, the REST services include an initialize_registry service to initialize resource registry 109, a get_metadata service to retrieve resource metadata from resource registry 109, an insert metadata service to store new resource metadata within resource registry 109, and a delete_metadata service to delete resource metadata from resource registry 109. FIG. 7 further illustrates an example database schema 704 of resource registry 109 for storing resource metadata including a resource identifier (ID) entry identifying a particular resource, a resource type entry identifying a type of the particular resource such as a component, subsystem, cluster, etc., an IP entry identifying a virtual IP (VIP) address or an IP address of the resource, and a version entry identifying a resource version of the resource.

Figure 8A:
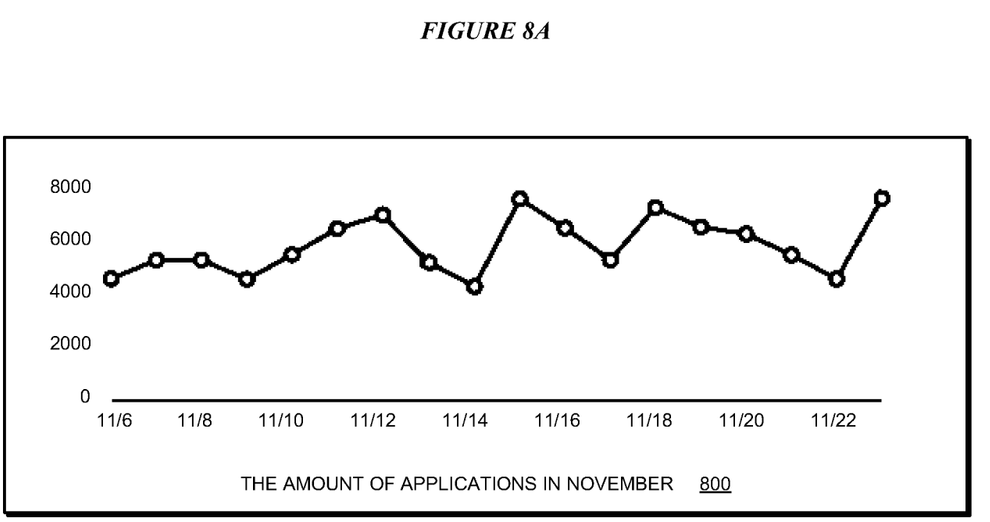
FIGS. 8A-8B, these figures depict example real-time data collected from a cloud deployment for resource pool management within the resource pool in accordance with an illustrated embodiment.
Figure 8B:
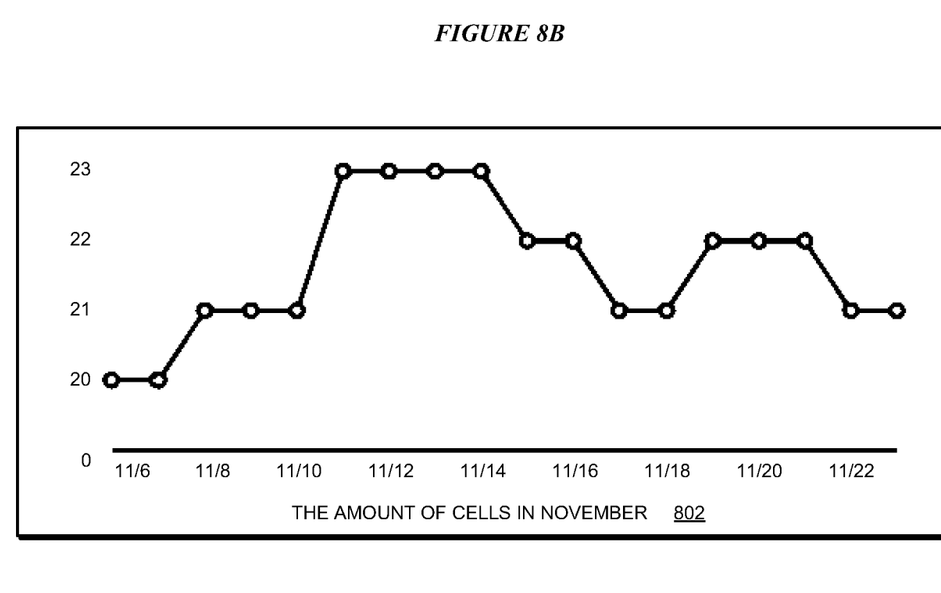

With reference to FIGS. 8A-8B, these figures depict example real-time data collected from a cloud deployment for resource pool management within the resource pool in accordance with an illustrated embodiment. FIG. 8A illustrates real-time data showing the amount of applications 800 utilized within resource pool during a particular time period, such as the month of November. FIG. 8B illustrates real-time data showing an amount of cells 802 within resource pool 120 utilized during the predetermined time period. In an embodiment, pool server 104 uses a cognitive process to dynamically allocate resources within the resource pool by computing a reverse calculation based on real-time data including the amount of applications 800 and amount of cells 802 utilized from resource pool 120 during the predetermined time period. In particular embodiments, sizes of the resource pool, a subsystem, and a cluster in the resource pool, are adjusted dynamically according to the reverse calculation upon the real-time data. In one or more embodiments, pool server 104 receives performance data associated with utilization of resources within the resource pool over a predetermined time period and adjusts a size of the resource pool based upon the performance data. In a particular embodiment, the performance data includes real-time data.

Figure 9:
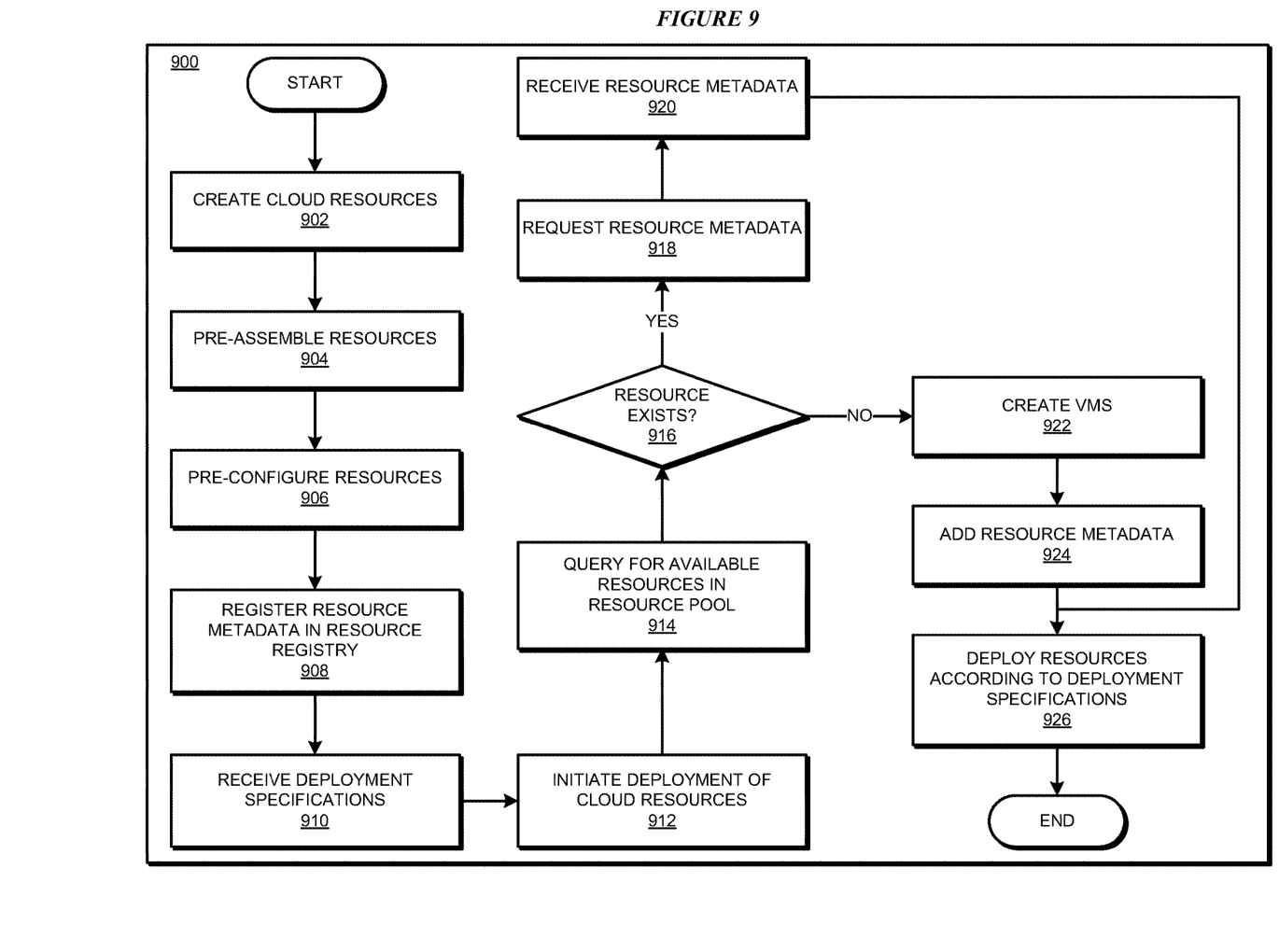
FIG. 9 depicts a flowchart of an example process for large-scale cloud deployment in accordance with an illustrative embodiment.

With reference to FIG. 9, this figure depicts a flowchart of an example process 900 for large-scale cloud deployment in accordance with an illustrative embodiment. In 902, an application, such as pool server CLI 105, of pool server 104 creates cloud resources for resource pool 120. In 904, the application pre-assembles the resources of resource pool 120. In 906, the application pre-configures the resources of resource pool 120. In 908, the application registers resource metadata for the resources in resource pool 120 in resource registry 109.

In 910, the application receives deployment specifications for implementing a requested cloud service from deployment director component 107. In 912, the application initiates deployment of cloud resources from resource pool 120 to deploy the requested cloud service according to the deployment specifications. In 914, the application queries resource pool 120 for available resources required by the deployment specifications. In 916, the application determines whether a first resource required by the deployment specifications exists within resource pool 120.

If the first resource exists within resource registry 109, in 918 the application requests first resource metadata for the first resource from resource registry 109. In 920, the application receives the first resource metadata from resource registry 109 and the process proceeds to 926.

If the first resource does not exist within resource registry 109, in 922 the application creates a second resource, such as one or more VMs, required by the deployment specifications within resource pool 120. In 924, the application adds second resource metadata associated with the second resource to resource registry 109 and the process proceeds to 926.

In 926, the application deploys one of the first resource and the second resource from resource pool 120 according to the deployment specifications to implement the requested cloud service. The procedure 900 then ends.

Thus, a computer implemented method is provided in the illustrative embodiments for accelerating and maintain a large-scale cloud deployment and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   receiving, by a server, a deployment specification for implementing a requested cloud service;
   querying, by the server, a resource pool for available resources required by the deployment specification, the resource pool including a plurality of pre-configured resources for implementing one or more cloud services, each of the plurality of pre-configured resources comprising a virtual machine provisioned from an infrastructure and available for deployment, the virtual machine having installed thereon a set of operating system components and an application;
   determining that a first resource within the resource pool matches requirements of the deployment specification; and
   deploying the first resource from the resource pool according to the deployment specification to implement the requested cloud service, deploying the first resource including storing, in a resource registry, first resource metadata associated with the first resource, the first resource metadata including a resource identifier of the first resource, a resource type of the first resource, an IP address of the first resource, and a version entry identifying a resource version of the first resource.

2. The method of claim 1, further comprising:
   determining that the first resource required by the deployment specification is not available within the resource pool; and
   creating a second resource second resource required by the deployment specification within the resource pool.

3. The method of claim 2, further comprising:
   adding second resource metadata associated with the second resource to a database.

4. The method of claim 3, further comprising:
   deploying the second resource from the resource pool according to the deployment specification to implement the requested cloud service.

5. The method of claim 1, further comprising:
   creating a plurality of resources within the resource pool;
   pre-assembling and pre-configuring the plurality of resources; and
   registering metadata corresponding to the plurality of resources in a database.

6. The method of claim 1, further comprising:
   receiving performance data associated with utilization of the pre-configured resources within the resource pool over a predetermined time period; and
   adjusting a size of the resource pool based upon the performance data.

7. The method of claim 6, wherein the performance data includes real-time data.

8. The method of claim 5, wherein the database includes the resource registry.

9. The method of claim 1, wherein the server includes a command line interface (CLI).

10. The method of claim 1, wherein the deployment specification is received from a deployment director component.

* * * * *